(12) United States Patent
Nakazeki et al.

(10) Patent No.: US 6,502,992 B2
(45) Date of Patent: Jan. 7, 2003

(54) HYDRODYNAMIC TYPE BEARING UNIT

(75) Inventors: Tsugito Nakazeki, Kuwana (JP); Kazuo Okamura, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/817,752

(22) Filed: Mar. 27, 2001

(65) Prior Publication Data

US 2001/0048778 A1 Dec. 6, 2001

(30) Foreign Application Priority Data

Mar. 28, 2000 (JP) ........................................ 2000-088670

(51) Int. Cl.[7] ................................................ F16C 32/06
(52) U.S. Cl. ........................................ 384/110; 384/107
(58) Field of Search ................................ 384/107, 100, 384/110, 113, 119, 132

(56) References Cited

U.S. PATENT DOCUMENTS 6,118,620 A * 9/2000 Grantz et al. ............... 384/107
6,144,523 A * 11/2000 Murthy et al. ............... 384/110
6,296,391 B1 * 10/2001 Hayakawa et al. .......... 384/119
6,299,356 B1 * 10/2001 Okamura et al. ............ 384/114
6,307,293 B1 * 10/2001 Ichiyama .................... 384/123

* cited by examiner

Primary Examiner—Christopher P. Schwartz
(74) Attorney, Agent, or Firm—Arent Fox Kintner Plotkin & Kahn, PLLC

(57) ABSTRACT

A hydrodynamic type bearing unit comprises a shaft member 2, a bearing member 4 and a bearing clearance formed between the shaft member 2 and a bearing member 4 to produce a hydrodynamic pressure during the rotation of a shaft member 2. The bearing clearance is composed of a first clearance $C_1$ on one axial side and a second clearance $C_2$ on the other axial side and the first and second clearances $C_1$ and $C_2$ are mutually oppositely inclined against an axial direction.

6 Claims, 4 Drawing Sheets

HYDRODYNAMIC TYPE BEARING UNIT

BACKGROUND OF THE INVENTION

The present invention relates to a hydrodynamic type bearing unit. This bearing unit is suitable for use as a spindle support particularly for the spindle motors of information equipment (for example, the spindle motors of magnetic disk devices, such as HDDs and FDDs, optical disk devices, such as CD-ROMs and DVD-ROMs, and magneto-optical disk devices, such as MDs and MOs, or the polygon scanner motors of laser beam printers (LBPs)).

Required of the spindle motors of said various items of information equipment are high rotation accuracy, high speed, low cost, low noise, etc. One of the components which determine these required items of performance is a bearing which supports the spindle of said motor. A conventional hydrodynamic type bearing exhibiting superior characteristics that satisfy the required performance criteria is known.

FIG. 5 shows an example of this kind of spindle motor constructed such that a shaft member 112 (composed of a shaft 112a and a thrust disk 112b which serves as a flange portion when mounted on the shaft 112a) rotatably supported by a bearing unit 111 is driven for rotation by the exciting force produced between a motor stator Ms and a motor rotor Mr. The bearing unit 111 is composed by disposing the shaft member 112 on the inner periphery of a cylindrical bearing member 114. The bearing unit 111 is provided with a radial bearing portion 115 for supporting the shaft member 112 in the radial direction and a thrust bearing portion 116 for supporting the thrust disk 112b in the thrust direction. Hydrodynamic type bearings having hydrodynamic pressure-producing grooves (hydrodynamic grooves) in the bearing surfaces are used as these bearing portions 115 and 116. The hydrodynamic grooves in the radial bearing portion 115 are formed, e.g., in the inner peripheral surface of the bearing member 114, while the hydrodynamic grooves in the thrust bearing portion 116 are formed, e.g., in the opposite end surfaces of the thrust disk 112b fixed to the lower end of the shaft 112a.

When the shaft member 112 rotates, hydrodynamic oil films are formed in a bearing clearance Cr (defined between the outer peripheral surface of the shaft 112a and the inner peripheral surface of the bearing member 114) in the radial bearing portion 115 and bearing clearances Cs1 and Cs2 (defined between the opposite end surfaces of the thrust disk 112b and the surface of the bearing member 114 opposed thereto) in the thrust bearing portion 116, and the shaft member 112 is rotatably supported in the state of non-contact with respect to the bearing member 114.

In recent years, in said various items of information equipment, there has been a strong demand for weight reduction and thickness reduction. Particularly in HDDs, there has been a tendency for the range of use to expand from the use of the stationary type, such as desktop personal computers used so far, to the use of the portable type, such as mobile type PCs and digital cameras, such demand being particularly strong.

With the bearing unit 111 shown in FIG. 5, however, thickness reduction beyond the status quo has been limited because of the individual provision of the radial bearing portion 115 and the thrust bearing portion 116. Particularly for a use in which compatibility with PC cards is required, thickness reduction of HDDs is essential; however, with the construction in FIG. 5, it has been hard to take sufficient measures therefor.

SUMMARY OF THE INVENTION

Accordingly, objects of the invention are to provide a hydrodynamic type bearing unit which makes thickness reduction and weight reduction possible and which is produced at low cost, and to provide a method of producing said bearing unit at low cost and with high accuracy.

To achieve said objects, the invention provides a hydrodynamic type bearing unit comprising a shaft member and a bearing member opposed to an outer periphery of the shaft member via a bearing clearance, and supporting said shaft member without contact by means of the hydrodynamic pressure produced in said bearing clearance during the relative rotation between the shaft member and the bearing member, wherein said shaft member is composed of a plurality of parts and said bearing clearance is composed of a first clearance on one axial side and a second clearance on the other axial side, said first and second clearances being mutually oppositely inclined against an axial direction.

By mutually oppositely inclining the first and second clearances in this manner, the support force components of the hydrodynamic pressures produced in the first and second clearances act in the radial direction and opposite thrust directions, so that radial loads and opposite thrust loads can be stably held in the same manner as in a conventional bearing unit having radial and thrust bearing portions. Furthermore, unlike the conventional article, since the two bearing portions are integrally constructed, the thickness reduction and weight reduction of the bearing unit is attained.

The first and second clearances are inclined such that they are displaced greater toward the inner diameter as the bearing center (the axial center of the bearing) is approached, whereby the loading capacity for the moment around the axis can be increased.

Various items of information equipment have a strong demand for weight reduction and thickness reduction. Particularly in HDDs, there has been a tendency for the range of use to expand from the use of the stationary type, such as desktop personal computers used so far, to the use of the portable type, such as mobile type PCs and digital cameras, such demand being particularly strong.

According to the invention, the width between the first and second clearances is made adjustable by managing the axial relative positions of the first and second shaft members and the axial alignment. In the conventional article, since the thrust bearing portion is formed within the unit, it has been difficult to maintain the bearing clearance with high accuracy, whereas according to the invention, since the width between the first and second clearances can be managed from outside the unit by adjusting the axial relative positions of the first and second shaft members, it is possible to obtain bearing clearances of high accuracy. In this case, if a guide portion is provided between the first and second shaft members for axially guiding either of the members, then the guiding action of the guide portion allows the axial relative positions of the first and second shaft members to be adjusted while maintaining the axial alignment between the first and second shaft members, so that accurate bearing clearances can be easily obtained.

By making the bearing member of sintered metal retaining oil therein, it is possible to attain pumping balance between the first and second clearances to increase the operating stability.

The hydrodynamic type bearing units described above can be produced by disposing a clearance defining member between the first shaft member and the bearing member and intimately contacting said clearance defining member with the first shaft member and bearing member, intimately contacting the second shaft member with the bearing member and fixing them together in this state, and removing said clearance defining member to define first and second clearances. In this case, the accuracies of the first and second clearances depend on the accuracy (thickness) of the clearance defining member rather than on the accuracy of such single parts as the shaft member and bearing member; thus, bearing clearances of high accuracy can be obtained at low cost without being influenced by the accuracy of the single parts.

In this production process, it is preferable that the clearance defining member be made of resin material and that the removal of the clearance defining member be effected by a solvent.

A lightweight thickness-reduced spindle motor (disk device spindle motor, LBP polygon scanner motor or the like) for information equipment is constructed, wherein the spindle of information equipment is rotatably supported by a hydrodynamic type bearing unit described above.

DESCRIPTION OF THE PREFERRED EMBODIMENTS

Embodiments of the invention will now be described with reference to FIGS. 1–4.

Figure 1:
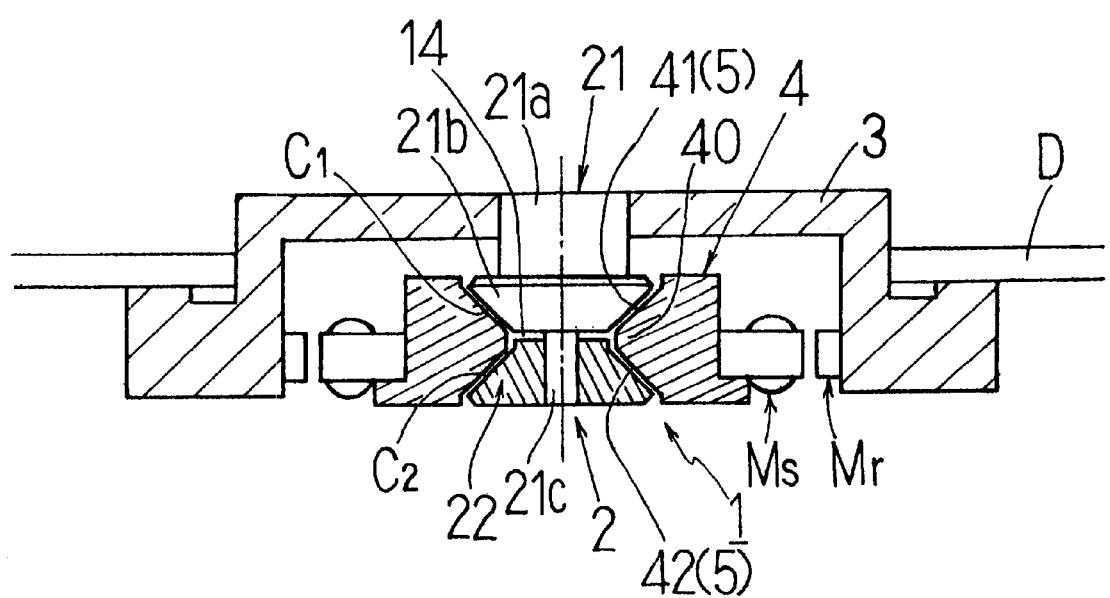
FIG. 1 is a sectional view of a hydrodynamic type bearing unit according to the invention.

FIG. 1 is a sectional view of an information equipment spindle motor provided with a hydrodynamic type bearing unit 1 according to the invention and, as an example, an HDD (hard disk drive) spindle motor is shown. This spindle motor comprises a bearing unit 1 rotatably supporting a shaft member 2 serving as a spindle, a disk hub 3 attached to the shaft member 2 and holding one or a plurality of magnetic disks D, and a motor stator Ms and a motor rotor Mr which are opposed to each other with a radial gap defined therebetween. The stator Ms is attached to the fixed side of the hydrodynamic type bearing unit 1 (in this embodiment, the outer peripheral surface of the bearing member 4), and the rotor Mr is attached to the rotary side of the bearing unit 1 (in this embodiment, the inner peripheral surface of the disk hub 3). When an electric current is passed through the stator Ms, the exciting force produced between the stator Ms and the rotor Mr rotates the rotor Mr, and the disk hub 3 and the shaft member 2 rotate.

The bearing unit 1 has, as its main components, the shaft member 2 and a substantially cylindrical bearing member 4 which is fitted on the shaft member 2 so that its inner peripheral surface is opposed to the outer peripheral surface of the shaft member 2.

The shaft member 2 is composed of a first shaft member 21 and a second shaft member 22. The first shaft member 21 is disposed on one axial side (for example, upper side in the figure) and the second shaft member 22 is disposed on the other axial side coaxially with the first shaft member 21.

The first shaft member 21 is of the construction in which a base portion 21a, a taper portion 21b and a guide portion 21c are coaxially arranged in the order mentioned as seen from one axial side. The base portion 21a has a cylindrical outer peripheral surface and the inner peripheral surface of the disk hub 3 is fixed on said outer peripheral surface as by force fit. The taper portion 21b has a conical outer peripheral surface (taper surface) gradually increased in diameter as one axial side is approached. The guide portion 21c has a cylindrical outer peripheral surface and its outer diameter is smaller than the minimum outer diameter of the taper portion 21b.

The guide portion 21c of the first shaft member 21 has the second shaft member 22 fixed thereto by a suitable fixing method, e.g., bonding. The second shaft member 22 has a conical outer peripheral surface (taper surface) as in the case of the taper portion 21b of said first shaft member 21; however, said outer peripheral surface, contrary to the taper portion 21b, gradually decreases in diameter as the one axial side is approached. The guide portion 21c and the second shaft member 22 are fitted together with a clearance defined therebetween so that before being bonded together, they are respectively axially relatively movable.

The bearing member 4 is substantially cylindrical with the inner periphery bulged to obtain a triangular cross section. Of the bulged portion 40, the inner peripheral surface 41 on one axial side is in the form of a conical surface which is gradually increased in diameter as one axial side is approached, while the inner peripheral surface 42 on the other axial side 42 is in the form of a conical surface which, contrarily, is gradually decreased in diameter as one axial side is approached. The inner peripheral surface 41 on one axial side is parallel with the outer peripheral surface of the taper portion 21b of the first shaft portion 21, while the inner peripheral surface 42 on the other axial side is parallel with the outer peripheral surface of the second shaft member 22. The axial distance between the inner peripheral surfaces 41 and 42 is slightly less than the axial distance between the outer peripheral surface of the taper portion 21b and the outer peripheral surface of the second shaft member 22 which are opposed to said inner peripheral surfaces. This results in small (usually several $\mu$m to tens of $\mu$m) bearing clearances $C_1$ and $C_2$ being defined between the outer peripheral surface of the shaft member 2 and the inner peripheral surface of the bearing member 4 (in addition, in the figures, the width of the bearing clearances $C_1$ and $C_2$ is shown exaggerated).

The bearing clearance $C_1$ (first clearance) defined between the inner peripheral surface 41 of the bearing member on one axial side and the outer peripheral surface of the taper portion 21b is inclined with respect to the axial center axis, while the bearing clearance $C_2$ (second clearance) defined between the inner peripheral surface 42 of the bearing member on the other axial side and the outer peripheral surface of the second shaft member 22 is inclined in the direction opposite to that for the first clearance $C_1$. Any of the bearing clearances $C_1$ and $C_2$ is of straight shape, and the direction of inclination thereof is one in which the side of the mating clearances (the axial center side of the bearing) gradually displaces toward the inner diameter side, and their angles of inclination are equal. The width of the bearing clearances $C_1$ and $C_2$ can be adjusted by managing the axial relative positions of the first and second shaft members 21 and 22, i.e., by axially shifting the first and second shaft members 21 and 22 so as to move the two members toward or away from each other.

The inner and outer peripheral surfaces 41 and 42 on one axial side and the other axial side of the bearing member 4 opposed to the two bearing clearances $C_1$ and $C_2$, respectively, are each formed with a bearing surface 5 having a plurality of hydrodynamic grooves. The shape of the hydrodynamic grooves in the bearing surfaces 5 may be optionally selected; any of the known herringbone type, spiral type, step type, multi-arc type, etc. may be selectively used or a suitable combination thereof may be used. The bearing surfaces 5 may be formed not only in the inner peripheral surface of the bearing member 4 but also either or both of them may be formed in the outer peripheral surface of the shaft member 2, i.e., the outer peripheral surface of the taper portion 21b of the first shaft member 21 and the outer peripheral surface of the second shaft member 22. The bearing surfaces 5 may be formed as by press working, in which case it is desirable that the member having the bearing surfaces 5, (in this embodiment, the bearing member 4) be made of soft metal, such as copper or brass, to ensure high precision with which the hydrodynamic grooves are formed.

Figure 5:
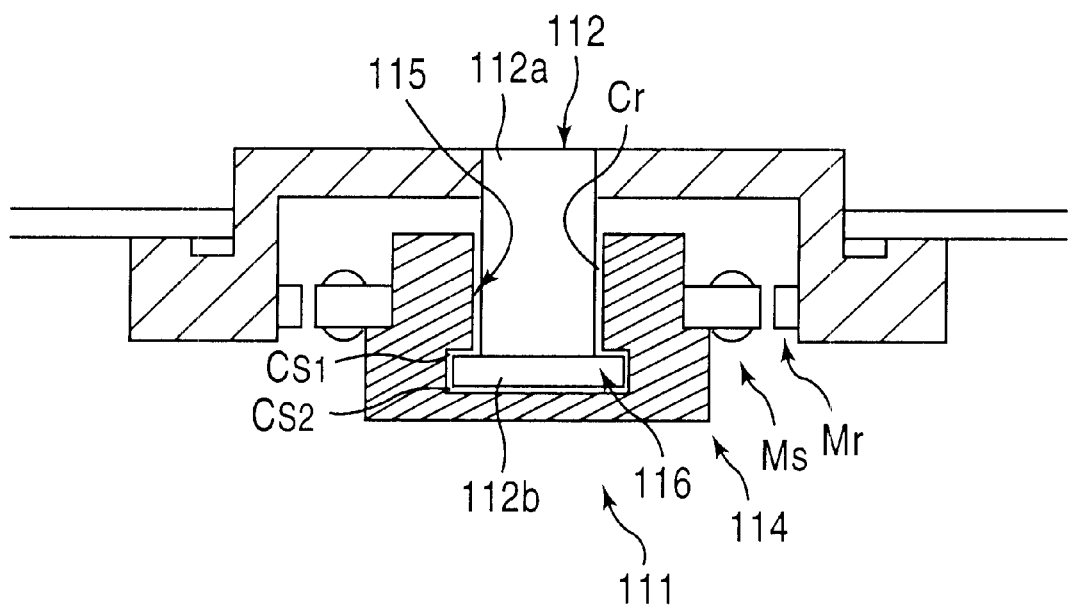
FIG. 5 is a sectional view of a conventional hydrodynamic type bearing unit.

After the space between the outer periphery of the shaft member 2 and the inner periphery of the bearing member 4 has been filled with working fluid, such as lubricating oil, the disk hub 3, motor rotor Mr and stator Ms are attached to said bearing unit 1, whereby the spindle motor shown in FIG. 1 is constructed. During the relative rotation between the shaft member 2 and the bearing member 4 (in this embodiment, during the rotation of the shaft member 2), the working fluid (e.g., lubricating oil) produces hydrodynamic pressures in the two bearing clearances $C_1$ and $C_2$, and this hydrodynamic action supports the shaft member 2 out of contact with the bearing member 4. The bearing clearances $C_1$ and $C_2$ are axially inclined in opposite directions as described above, whereby the shaft member 2 is noncontact-wise supported in radial direction and in opposite thrust directions, so that the bearing performance equivalent to that of the conventional bearing unit having the radial bearing portion 115 and thrust bearing portion 116 (see FIG. 5) is exhibited. The axial dimension can be further reduced by the amount corresponding to the inclination of the bearing clearances $C_1$ and $C_2$, as compared with the bearing unit shown in FIG. 5; for example, thickness reduction can be attained to the extent that application to information equipment compatible with PC cards is possible.

During the assembly of said bearing unit, the setting of the width of the bearing clearances $C_1$ and $C_2$ is performed by the following procedure.

Figure 2A:
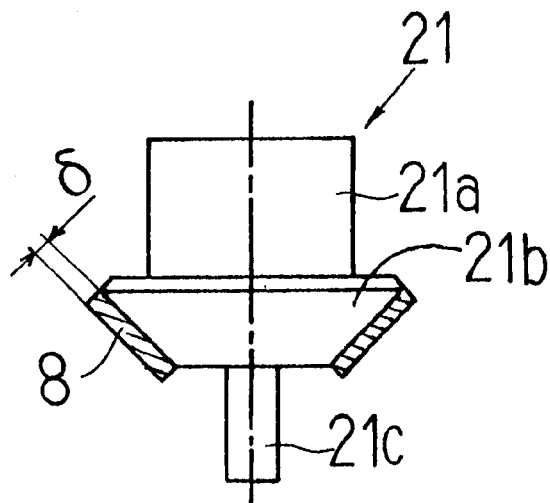
FIGS. 2(A), (B), (C) is a sectional view showing a method of producing such hydrodynamic type bearing unit according to the invention.
Figure 2B:
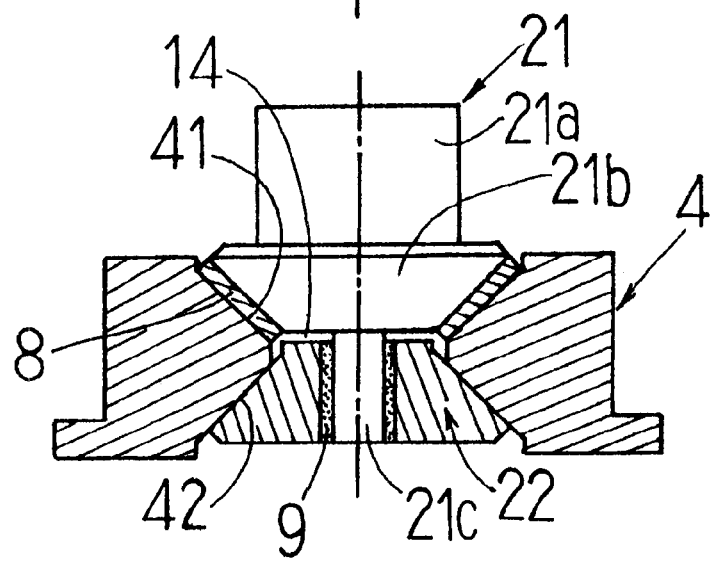

First, as shown in FIG. 2(A), a resin layer 8 of predetermined thickness serving as a clearance defining member is formed on the outer peripheral surface of the taper portion 21b of the first shaft member 21. The resin layer 8 is formed, e.g., by coating the outer peripheral surface of the taper portion 21b with a resin material and drying it, and the thickness δ of the resin layer 8 after drying is on the order of the sum ($C_1+C_2$) of the widths of the bearing clearances $C_1$ and $C_2$. Further, the region for formation of the resin layer 8 may the entire area of the taper surface of the taper portion 21b as shown and besides this, it may be part of said area. Then, as shown in FIG. 2(B), the first shaft member 21 is inserted in the inner periphery of the bearing member 4 from the guide portion 21c and the resin layer 8 is forced to intimately contact the inner peripheral surface 41 on one axial side of the bearing member 4. Then, the second shaft member 22 is pushed into the inner periphery of the bearing member 4 from the opposite side (at this time, the guide portion 21c is inserted in the inner diameter hole in the bearing member 4), and the outer peripheral surface of the second shaft member 22 is forced to intimately contact the inner peripheral surface 42 of the other axial side of the bearing member 4. In this push-in process, since the second shaft member 22 is axially guided by the guide portion 21c, axial alignment between the first shaft member 21 and the bearing member 4 is also secured.

As shown, after intimate contact between the second shaft member 22 and the inner peripheral surface 42, a small amount of axial clearance 14 is left between the end surface of the taper portion 21b of the first shaft member 21 and the end surface of the second shaft member 22, whereby said clearance 14 can be used as an oil reservoir when lubricating oil is used as working fluid, for example.

Then, an adhesive agent 9 is injected into the clearance between the inner peripheral surface of the second shaft member 22 and the outer peripheral surface of the guide portion 21c while maintaining the intimate contact between the bearing member 4 and the resin layer 8 and between the bearing member 4 and the second shaft member 22 and maintaining the intimate contact between the resin layer 8 and the first shaft member 21, and the second shaft member 22 and the first shaft member 21 are fixed together. As for the fixing method, besides bonding, it is possible to use force-fitting.

Figure 2C:
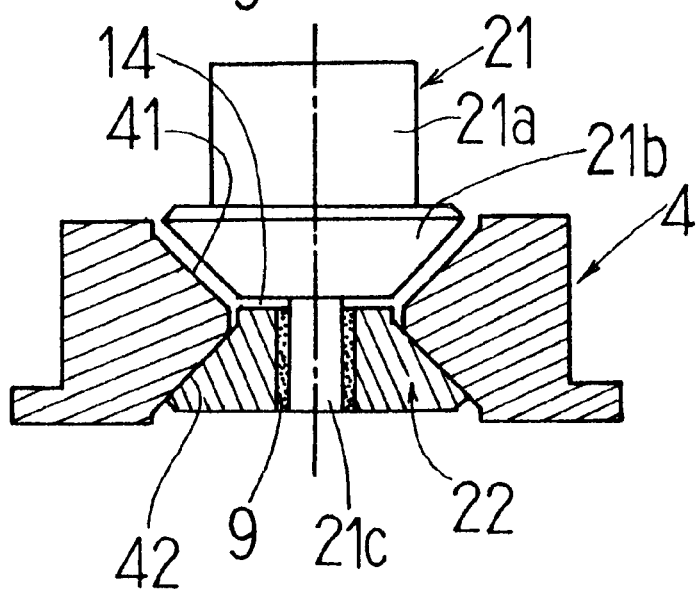

Then, a solvent is fed between the outer peripheral surface of the taper portion 21b and the inner peripheral surface 41 of the bearing member 4 to dissolve the resin layer 8, whereupon, as shown in FIG. 2(C), a bearing clearance ($C_1+C_2$) corresponding to the thickness δ of the resin layer 8 is defined between the outer peripheral surface of the taper portion 21b and the inner peripheral surface 41 of the bearing member 4. The combination of the resin material of the resin layer 8 and the solvent may be optionally selected provided that the resin layer 8 can be reliably dissolved; however, it is desirable to avoid the use of chlorine-containing resins, chlorine type solvents or corrosive solvents.

In this case, the sum of the widths of the two bearing clearances $C_1$ and $C_2$ is equal to the thickness δ of the resin layer 8; therefore, provided that the thickness δ is accurate, it follows that even if there is some error in the accuracy of the first and second bearing members 21 and 22 or bearing member 4, the bearing clearances $C_1$ and $C_2$ of high accuracy having high degrees of axial alignment and accuracy of inclination can be defined by a simple process at low cost without being influenced by the accuracy of single parts.

Figure 3:
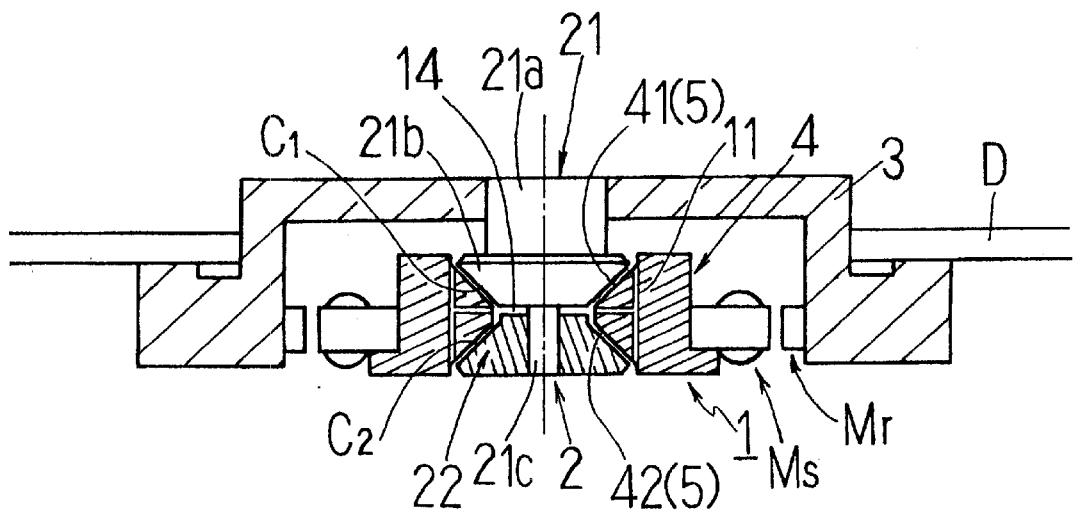
FIG. 3 is a sectional view showing another embodiment of the invention.

FIG. 3 shows another embodiment of the invention. In the case where hydrodynamic grooves of the herringbone type are employed, imbalance sometimes occurs in the amount of pumping in the inner peripheral surfaces 41 and 42. To avoid this, the space 14 between the bearing clearances $C_1$ and $C_2$ is put in communication with the outside of the bearing member 4 through a bypass passage 11.

Figure 4:
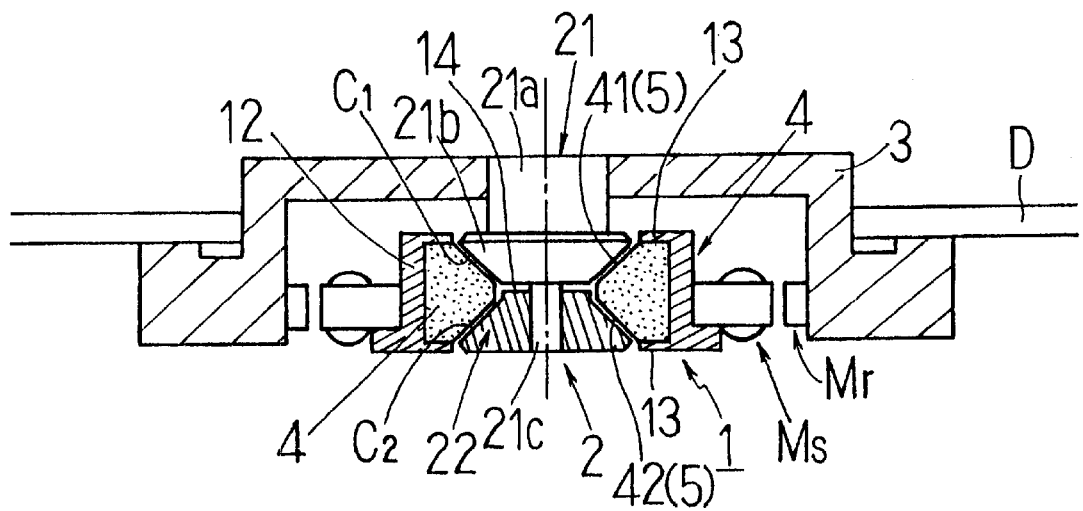
FIG. 4. is a sectional view showing another embodiment of the invention.

FIG. 4 shows another embodiment of the invention, wherein the bearing member 4 is formed of sintered metal impregnated with lubricating oil or lubricating grease to hold oil in the pores. The bearing member 4 is fixed by press fitting or bonding to the inner periphery of a housing 12 having a motor stator Ms fixed to the outer peripheral surface thereof. In the bearing of this kind, oil is circulated through the bearing clearances $C_1$ and $C_2$ and the interior of the bearing member 4, whereby the balance of pumping action is secured in the two bearing surfaces 5, so that the bypass passage 11 shown in FIG. 4 becomes unnecessary. In addition, in this case, in order to suppress (or prevent) the return flow of oil at the bearing surfaces 5 into the bearing member 4, it is desirable to seal the pores of the surface as by burnishing the portion in question. Further, for prevention of oil leakage, it is desirable to apply the same working to opposite end surface of the bearing member 4. The drawing shows by way of example a case where to enhance the oil leakage preventing function, seal members 13 are disposed on the inner diameter portions of the housing 12 at opposite ends thereof, said seal members 13 sealing opposite end surfaces of the bearing member 4.

In the above description, the construction has been shown by way of example in which as the bearing clearances $C_1$ and $C_2$, displacement toward the inner diameter side is greater as the mating clearance is approached; however, the direction of inclination may be reversed for each clearance so that displacement toward the outer diameter is greater as the mating clearance is approached. In this case, the loading capacity for the moment around the axis will be considerably lower than in the case of the construction shown in FIG. 1, but the same degree of effect can be attained in respect of thickness reduction. Further, the case is shown by way of example in which the shaft member 2 is rotatable while the bearing member 4 is fixed; however, the same effect can also be attained by reversing the case so that the shaft member 2 is fixed while the bearing member 4 is rotatable.

Thus, according to the invention, the bearing clearance is composed of a first clearance on one axial side and a second clearance on the other axial side and the first and second clearances are axially mutually oppositely inclined; therefore, thickness reduction of the bearing unit is possible and this arrangement is applicable even to information equipment required, e.g., to be compatible with PC cards. Further, bearing clearances having high degrees of axial alignment and accuracy of inclination can be defined by a simple process without being influenced by the accuracy of single parts, and compatibility between high accuracy and low cost of hydrodynamic type bearing units can be attained.

What is claimed is:

1. A hydrodynamic bearing unit comprising a shaft member and a bearing member opposed to an outer periphery of the shaft member via a bearing clearance, and supporting said shaft member without contact by means of hydrodynamic pressure produced in said bearing clearance during the relative rotation between the shaft member and the bearing member, wherein:

said shaft member comprises a plurality of parts and said bearing clearance comprises a first clearance on one axial side and a second clearance on the other axial side, said first and second clearances being mutually oppositely inclined relative to a longitudinal axis of said shaft member, wherein the first and second clearances are displaced greater inward toward an axial center of said bearing member, wherein the shaft member comprises a first shaft member and a second shaft member, wherein a width between the first and second clearances is adjusted by moving axial positions of the first and second shaft members toward or away relative to each other.

2. A method of forming the hydrodynamic bearing unit according to claim 1, comprising the steps of:

disposing a clearance defining member between the first shaft member and the bearing member;

intimately contacting said clearance defining member with the first shaft member and bearing member;

intimately contacting the second shaft member with the bearing member;

fixing the first shaft member and the second shaft member; and removing said clearance defining member to define first and second clearances.

3. A method of forming the hydrodynamic bearing unit according to claim 2, wherein the clearance defining member is made of resin material and the removal of the clearance defining member is effected by a solvent.

4. A hydrodynamic bearing unit according to claim 1, wherein a guide portion is disposed between the first and second shaft members and axially guides either of the members.

5. A hydrodynamic bearing unit according to claim 1, wherein the bearing member is made of sintered metal retaining oil therein.

6. A spindle motor for information equipment, wherein the spindle of information equipment is rotatably supported by a hydrodynamic bearing unit according to any of claims 1, 4, or 5.

* * * * *